US012649871B2

(12) United States Patent
Antony et al.

(10) Patent No.: US 12,649,871 B2
(45) Date of Patent: Jun. 9, 2026

(54) TAPE INCLUDING REACTIVE LAYER AND PROCESS FOR MAKING THE TAPE

(71) Applicant: 3M INNOVATIVE PROPERTIES COMPANY, St. Paul, MN (US)

(72) Inventors: Prince P. Antony, London (CA); Severin D. Chandler, White Bear Lake, MN (US); Heather J. Linbo, Woodbury, MN (US); Anibal S. Sanchez-Garca, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 18/274,699

(22) PCT Filed: Feb. 3, 2022

(86) PCT No.: PCT/IB2022/050950
§ 371 (c)(1),
(2) Date: Jul. 27, 2023

(87) PCT Pub. No.: WO2022/167972
PCT Pub. Date: Aug. 11, 2022

(65) Prior Publication Data
US 2024/0093067 A1 Mar. 21, 2024

Related U.S. Application Data

(60) Provisional application No. 63/145,035, filed on Feb. 3, 2021.

(51) Int. Cl.
*C09J 7/50* (2018.01)
*C09J 107/02* (2006.01)
*C09J 109/08* (2006.01)

(52) U.S. Cl.
CPC ............... *C09J 7/50* (2018.01); *C09J 107/02* (2013.01); *C09J 109/08* (2013.01);
(Continued)

(58) Field of Classification Search
CPC . C09J 7/50; C09J 107/02; C09J 109/08; C09J 2203/37; C09J 2301/122;
(Continued)

(56) References Cited

U.S. PATENT DOCUMENTS 2,410,078 A * 10/1946 Kellgren ................ D21H 17/35
525/139
2,532,011 A 11/1950 Dahlquist et al.
(Continued)

FOREIGN PATENT DOCUMENTS

CN 101195733 B 5/2013
CN 102120922 B 6/2014
(Continued)

OTHER PUBLICATIONS

JPH07278505A Machine Translation of Description (Year: 2025).*
(Continued)

*Primary Examiner* — Cynthia L Schaller
(74) *Attorney, Agent, or Firm* — Kathleen B. Gross

(57) ABSTRACT

The tape includes a backing, a reactive layer on the backing, and a pressure sensitive adhesive on the reactive layer. The reactive layer includes sulfur and a rubber at least partially crosslinked with polysulfide bonds. The pressure sensitive adhesive includes a hydrocarbon elastomer that is at least partially crosslinked and a tackifying resin. The process includes applying a dispersion of the rubber and sulfur to the backing, drying the dispersion to provide the reactive layer, and applying a pressure sensitive adhesive composition comprising the hydrocarbon elastomer and the tackifying resin as a hot melt on the reactive layer to provide the tape.

20 Claims, 1 Drawing Sheet

(52) U.S. Cl.
    CPC ...... *C09J 2203/37* (2020.08); *C09J 2301/122*
             (2020.08); *C09J 2301/302* (2020.08); *C09J*
             *2301/502* (2020.08); *C09J 2415/003* (2013.01)

(58) Field of Classification Search
    CPC ............ C09J 2301/302; C09J 2301/502; C09J
             2415/003; C09J 2421/00; C09J 2421/003;
                              C08L 7/02; C08L 9/10
    See application file for complete search history.

(56)                   References Cited

U.S. PATENT DOCUMENTS

| | | | |
|---|---|---|---|
| 2,607,711 | A | 8/1952 | Hendricks |
| 3,011,988 | A | 12/1961 | Luedke et al. |
| 3,318,852 | A | 5/1967 | Dixon |
| 4,463,120 | A | 7/1984 | Collins et al. |
| 5,266,400 | A | 11/1993 | Yarusso et al. |
| 5,385,783 | A | 1/1995 | Patel et al. |
| 5,439,963 | A | 8/1995 | Korpman |
| 5,539,033 | A | 7/1996 | Bredahl et al. |
| 5,728,759 | A | 3/1998 | Pike |
| 5,972,176 | A | 10/1999 | Kirk et al. |
| 6,777,490 | B2 | 8/2004 | Mussig et al. |
| 6,822,029 | B1 | 11/2004 | Burmeister et al. |
| 8,680,178 | B2 | 3/2014 | Meier et al. |
| 2002/0142154 | A1 | 10/2002 | Griffith, Jr. et al. |
| 2005/0032448 | A1 | 2/2005 | Matsumoto et al. |
| 2019/0284459 | A1* | 9/2019 | Schümann ........... C08G 18/698 |
| 2024/0343948 | A1 | 10/2024 | Li et al. |

FOREIGN PATENT DOCUMENTS

| | | | | |
|---|---|---|---|---|
| CN | 103897633 | B | | 6/2016 |
| CN | 103102822 | B | | 8/2016 |
| CN | 109135619 | A | | 1/2019 |
| CN | 110982453 | A | | 4/2020 |
| DE | 2649069 | A1 | * | 5/1978 |
| EP | 0668335 | A2 | | 8/1995 |
| EP | 0688843 | A1 | | 12/1995 |
| EP | 1666242 | B1 | | 9/2014 |
| EP | 3499664 | A1 | | 6/2019 |
| JP | H07278505 | A | * | 10/1995 |
| JP | 2003082308 | A | | 3/2003 |
| JP | 2021130731 | A | | 9/2021 |
| WO | 199411175 | A1 | | 5/1994 |
| WO | 2008026429 | A1 | | 3/2008 |
| WO | WO2013160102 | A1 | * | 10/2013 |

OTHER PUBLICATIONS

WO2013160102A1 Machine Translation of Description (Year: 2025).*
DE2649069A1 Machine Translation of Description (Year: 2025).*
EP0668335A2 Machine Translation of Description (Year: 2025).*
International Search Report for PCT International Application No. PCT/IB2022/050950, mailed on May 2, 2022, 4 pages.
Kovacic, "Crosslinking of Polymers with Dimaleimides", Journal of the American Chemical Society, 1959, vol. 81, No. 5, pp. 1187-1190.
Kovacic, "Crosslinking of Unsaturated Polymers with Dimaleimides", Journal of the American Chemical Society, 1959, vol. 81, No. 5, pp. 1190-1194.
Tawney, "Vulcanization with Maleimides", Journal of Applied Polymer Science, 1964, vol. 8, No. 5, pp. 2281-2298.

* cited by examiner

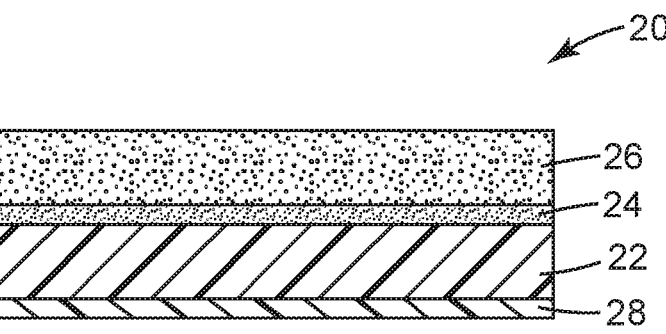

TAPE INCLUDING REACTIVE LAYER AND PROCESS FOR MAKING THE TAPE

CROSS-REFERENCE TO RELATED APPLICATION

This application is a national stage filing under 35 U.S.C. 371 of PCT/IB2022/050950, filed Feb. 3, 2022, which claims priority to U.S. Provisional Application No. 63/145,035, filed Feb. 3, 2021, the disclosure of which is incorporated by reference in its entirety herein.

BACKGROUND

In some tape applications, it is beneficial to be able to use the tape at relatively high temperatures. For example, in the painting of automobile bodies, a high drying/curing temperature between several painting steps can decrease the drying/curing time. Tapes that are based on rubbers can degrade at high temperatures. Heat-reactive crosslinkers have been used to counteract such degradation. Masking tapes that include rubbers and heat-reactive crosslinkers are typically made by solvent-coating a pressure sensitive adhesive composition. Hot melt adhesive formulations are limited in that commonly used heat-reactive crosslinkers cannot be added to the mixer. Crosslinking of the rubber composition in the mixer during hot melt processing can cause gel specks in the composition and fluctuations in viscosity. The consequences may be streaks and substantial fluctuations in the weight of composition applied to a tape and the reduction of the crosslinking potential during application. Moreover, if a hot melt line is halted, the rubber composition including crosslinkers may crosslink completely in the regions of elevated temperatures, greatly jeopardizing the ability to start up the line again without cleaning Some pressure sensitive adhesives that include a phenolic crosslinker made by various hot melt processes are disclosed in U.S. Pat. Nos. 6,822,029 (Burmeister et al.) and 8,680,178 (Meier et al.) and European Patent Application Publication 0668335, published Feb. 17, 1994.

SUMMARY

The present disclosure provides a rubber-based tape useful, for example, for higher temperature applications.

In one aspect, the present disclosure provides a tape that includes a backing, a reactive layer on the backing, and a pressure sensitive adhesive on the reactive layer. The reactive layer includes sulfur and a rubber at least partially crosslinked with polysulfide bonds. The pressure sensitive adhesive includes a hydrocarbon elastomer that is at least partially crosslinked and a tackifying resin.

In another aspect, the present disclosure provides a process of making the tape described above. The process includes applying a dispersion of the rubber and sulfur to the backing, drying the dispersion to provide the reactive layer, and applying a pressure sensitive adhesive composition comprising the hydrocarbon elastomer and the tackifying resin as a hot melt on the reactive layer to provide the tape. The terms "dispersion of rubber" and "pressure sensitive adhesive composition" as used herein generally include the rubber and hydrocarbon elastomer before they are at least partially crosslinked.

In another aspect, the present disclosure provides a method of using the tape as described above. The method includes applying the tape to a surface and exposing the surface to a temperature of at least 150° C. In other words, the present disclosure provides the use of the tape at a temperature of at least 150° C.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "hydrocarbon elastomer" refers to elastomers that have only carbon and hydrogen atoms. Hydrocarbon elastomers exclude acrylic, urethane, and silicone elastomers.

The terms "cure" refers to joining polymer chains together by covalent chemical bonds to form a network polymer. Therefore, in this disclosure the terms "cured" and "crosslinked" may be used interchangeably. A cured or crosslinked polymer is generally characterized by insolubility but may be swellable in the presence of an appropriate solvent. The term "crosslinked elastomer" includes partially crosslinked elastomers. The term "curable" refers to a polymer that is not yet cured or crosslinked.

The term "elastomer" refers to a molecule having a structure which essentially includes the multiple repetition of units derived, actually or conceptually, from molecules of low relative molecular mass. The term "elastomer" refers to a type of polymer with elastic character.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

BRIEF DESCRIPTION OF THE DRAWING

The disclosure may be more completely understood in consideration of the following detailed description of various embodiments of the disclosure in connection with the accompanying FIGURE, in which:

FIG. 1 is a cross-sectional view of an embodiment of a tape of the present disclosure.

DETAILED DESCRIPTION

Hot melt rubber adhesive based tapes are typically not useful above 300° F. (149° C.) due to degradation of the rubber adhesive at these temperatures. The present disclosure provides a tape including a reactive layer and a pressure sensitive adhesive (PSA). While this disclosure is not intended to be bound by theory, sulfur in the reactive layer is believed to diffuse into and react with the adhesive during the hot melt adhesive coating at or above 300° F. (149° C.) to induce partial crosslinking in the PSA. It is possible, although not required, to further crosslink the PSA on the reactive layer by passing the tape through an oven at 200° F. (93° C.) or higher and/or by exposure to radiation. Furthermore, during use at 200° F. (93° C.) or higher or 300° F. (149° C.) or higher, the sulfur in the reactive layer can continue to crosslink the PSA, thereby counteracting any degradation of the elastomeric component at such temperatures.

As illustrated in FIG. 1, the present disclosure provides a tape 20 comprising a backing 22, a reactive layer 24 on the backing 22, and a pressure sensitive adhesive 26 on the reactive layer 24.

In any of the embodiments of a tape according to the present disclosure, the backing 22 can be any polymeric film material, paper, or a polymer-cloth laminate. Polymeric materials suitable for the backing include polyesters; polyolefins (e.g., polyethylene, propylene); ethyl cellulose film; cellulose esters (e.g., cellulose acetate, cellulose acetate butyrate, and cellulose propionate); polyvinylidene chloride-vinyl chloride and/or acrylonitrile polymers such as saran; vinyl chloride polymers (e.g., poly(vinyl chloride) and copolymers of vinyl chloride and vinyl acetate); polyfluoroethylenes (e.g., polytetrafluoroethylene and polytrifluorochloroethylene); polyvinyl alcohol; polyamides such as nylon; polystyrenes such as the copolymers of styrene and isobutylene; regenerated cellulose; benzyl cellulose; cellulose nitrate; gelatin; glycol cellulose; flexible acrylate and methacrylates; urea aldehyde films; polyvinyl acetal; polyvinyl butyral. In some embodiments, the backing 22 is a polymeric film comprising at least one of a polyolefin, polyester, or poly(vinyl chloride). In some embodiments, the backing comprises polyethylene-laminated cloth. In some embodiments, the polymeric film backing comprises at least one of monoaxially oriented polypropylene, biaxially oriented polypropylene, or polyethylene terephthalate.

In some embodiments, the polymer film backing 22 of the tape 20 of the present disclosure is surface treated before the reactive layer is applied. Useful surface treatments include electrical discharge in the presence of a suitable reactive or non-reactive atmosphere (e.g., plasma, glow discharge, corona discharge, dielectric barrier discharge or atmospheric pressure discharge); ultraviolet light exposure, electron beam exposure, flame discharge, and scuffing. The surface treatment can be applied as the polymer film backing is being made or in a separate process. In some embodiments, the polymer film backing is surface treated using corona discharge. An example of a useful corona discharge process is described in U.S. Pat. No. 5,972,176 (Kirk et al.).

In some embodiments, tape 20 includes optional low-adhesion backsize 28. Low-adhesion backsizes are known to one of ordinary skill in the art can be made from a variety of materials (e.g., a silicone, fluorochemical, or carbamate). Some examples of low-adhesion backsizes are described, for example, in U.S. Pat. Nos. 2,532,011 (Dahlquist), 2,607,711 (Hendricks), and 3,318,852 (Dixon).

A paper backing for the tape of the present disclosure can be any suitable paper, for example, crepe paper having a weight of about 20 to 40 pounds per ream of 3000 square feet. The paper can be saturated with an aqueous emulsion of rubbers, for example, a mixture of carboxylated rubber latexes (e.g., carboxylated nitrile, styrene butadiene, and optionally acrylic rubber latexes) in a variety of ratios, optionally including polyethyleneglycol. Conventional additives such as pigments and antioxidants such as those described below can be included in the saturant. The aqueous saturant formulation may be 10% to 50% solids and may be applied to the paper at about 10% to 150% by weight, based on the weight of latex solids and dry paper weight. The saturated paper is typically then dried and cured at an elevated temperature up to about 180° C. A conventional release coating is typically applied to one face of the impregnated paper backing. An example of a release coating formulation includes a 10:90 mixture of one acrylate (e.g., available from Dow Chemical Co., Midland, Mich., under the trade designation "RHOPLEX") and a second acrylate (e.g., available from BASF, Florham Park, N.J., under the trade designation "ACRONAL S504"), which also contains some nitrile and butadiene rubbers. The mixture can be applied as an emulsion of about 15% to 50% solids, after which, the tape is again dried. Other suitable release coatings include water-based polyurethane/acrylic dispersions such as those from Hitac Adhesives and Coatings, Santa Fe Springs, CA, USA, under the trade designations "HITAC RA-13W", "HITAC RA-15W", and "HITAC RA-42W".

Referring again to FIG. 1, the tape 20 of the present disclosure includes a reactive layer 24. The reactive layer includes sulfur and a rubber at least partially crosslinked with polysulfide bonds. Examples of suitable rubbers for the reactive layer include natural rubber, synthetic polyisoprene rubber, styrene/butadiene rubber, and acrylonitrile butadiene rubber. Sulfur refers to elemental sulfur. Sulfur is available in many forms such as powdered sulfur, precipitated sulfur, colloidal sulfur, insoluble sulfur, and highly dispersible sulfur and halogenated sulfurs such as sulfur monochloride and sulfur dichloride. Sulfur, for example, cyclic $S_8$, reacts with rubbers having carbon-carbon double bonds and forms crosslinks between polymer chains. The crosslinks include polysulfide bonds. The term "polysulfide bond" refers to sulfur-sulfur bonds and includes disulfide bonds. That is, the crosslinks between polymer chains can include —S—S—, —S—S—S—, —S—S—S—S—, —S—S—S—S—S—, and/or –S—S—S—S—S— polysulfide bonds, for example. Crosslinking a rubber with sulfur is generally carried out by heating the rubber in the presence of sulfur at an elevated temperature, for example, 160° F. (71° C.), 200° F. (93° C.), 250° F. (121° C.), 300° F. (149° C.), or above. The presence of polysulfide bonds in a crosslinked rubber can be determined by infrared spectroscopy and other analytical techniques using methods known in the art.

In some embodiments, the reactive layer includes a vulcanization accelerator. A vulcanization accelerator is believed to break sulfur chains and lower the activation energy required for vulcanization. Examples of useful vulcanization accelerators include sulfeneamide vulcanization accelerators (e.g., those made from mercaptobenzothiazole and a primary amine such as cyclohexylamine or tert-butylamine), thiourea vulcanization accelerators (e.g., ethylene thiourea), thiazole vulcanization accelerators (e.g., mercaptobenzothiazole, zinc-2-mercaptobenzothiazole, or 2-benzothiazolyl disulfide), dithiocarbamate vulcanization accelerators (e.g., zinc diethyldithiocarbamate and zinc dibutyldithiocarbamate), xanthogenic acid vulcanization accelerators, and thiuram vulcanization accelerators (e.g., tetramethylthiuram disulfide and tetraethylthiuram disulfide). A combination of different classes of vulcanization accelerators may be useful. Such compounds, when used, can be present in an amount from about 0.01 to 3 percent by weight based on the total weight of the reactive layer.

In some embodiments, the reactive layer includes a vulcanization activator. Although there are no specific limitations on the type of the vulcanization activator, poly(ethylene glycol), stearic acid, zinc oxide, another metal oxide, or another metal salt can be useful. While this disclosure is not intended to be bound by theory, it is believed that in the process of vulcanization, the zinc oxide or other metal salt activates the vulcanization accelerators described above. In some embodiments, the combination of stearic acid and zinc oxide or another metal oxide provides a salt that is more rubber-soluble that activates the vulcanization accelerators. Also, poly(ethylene glycol), which may have any useful molecular weight (e.g., in a range from 200 grams per mole to 8000 grams per mole), is typically compatible with rubbers and may prevent adsorption of the vulcanization accelerators by other components of the rubber composition (e.g., glass bubbles). Vulcanization activators, when used, can be present in an amount from about 0.01 to 3 percent by weight based on the total weight of the reactive layer. In some embodiments, the reactive layer includes zinc oxide.

In some embodiments, the reactive layer includes a tackifying resin such as those described below in connection with the PSA. The tackifying resin can be useful, for example, for improving the adhesion of the reactive layer to the backing and/or the PSA. In some embodiments, the tackifying resin is present in the reactive layer in an amount that is different from the amount of tackifying resin in the PSA. In some embodiments, the reactive layer comprises not more than 10, 9, 8, 7, 6, or 5 percent by weight of the tackifying resin. In some embodiments, the amount of tackifying resin in the reactive layer is insufficient to make the reactive layer tacky.

The reactive layer including sulfur, the rubber that is at least partially crosslinked with polysulfide bonds, and optionally the vulcanization accelerator, vulcanization acti- vator, and tackifying resin can be applied any of the tape backings described above in a variety of ways. Since sulfur is typically a solid, it can be useful to disperse or dissolve sulfur and the other components using at least one of an organic solvent or water for applying to the backing. Examples of organic solvents that are useful for dispersing or dissolving the components of the reactive layer include aliphatic and alicyclic hydrocarbons (e.g., hexane, heptane, and cyclohexane), aromatic solvents (e.g., benzene, toluene, and xylene), ethers (e.g., diethyl ether, glyme, diglyme, diisopropyl ether, and tetrahydrofuran), esters (e.g., ethyl acetate and butyl acetate), alcohols (e.g., ethanol and iso- propyl alcohol), ketones (e.g., acetone, methyl ethyl ketone, and methyl isobutyl ketone), sulfoxides (e.g., dimethyl sulfoxide), amides (e.g., N,N-dimethylformamide, N,N dim- ethylacetamide, and N-methyl-2-pyrrolidone), halogenated solvents (e.g., methylchloroform, 1,1,2-trichloro-1,2,2-trif- luoroethane, trichloroethylene, and trifluorotoluene), and mixtures thereof. The reactive layer can then be dried to remove the solvent or water before the PSA is applied. Drying can be carried out at room temperature or at an elevated temperature, e.g., about 80° C. to 120° C. based on the backing substrate and web line speed, for example, to remove the solvent or water. Drying can also be carried out under vacuum.

In some embodiments, applying the reactive layer to the backing includes applying an aqueous dispersion of rubber and sulfur to the backing. Optionally the dispersion further includes at least one of a vulcanization accelerator, a vul- canization activator, and a tackifying resin. Aqueous disper- sions of rubbers, aqueous dispersions of tackifying resins, and aqueous dispersions of sulfur are commercially avail- able from a variety of sources. For example, latexes of natural rubber, synthetic polyisoprene rubber, styrene/buta- diene rubber, and acrylonitrile butadiene and aqueous dis- persions of rosin acids, rosin esters, C5 aliphatic hydrocar- bon resins, C9 aromatic resins, and mixed aliphatic-aromatic hydrocarbon resins can all be obtained commercially. A useful dispersion of sulfur, zinc oxide, zinc-2-mercaptoben- zothiazole, and zinc diethyl dithiocarbamate is commer- cially available from Tiarco Chemical, Dalton, Ga., under the trade designation "OCTOCURE 590". Useful sulfur dispersions can contain, for example, in a range from 10 to 70 percent by weight solids in the aqueous dispersion. Rubber latexes and aqueous dispersions of sulfur and tacki- fying resins can be combined to provide the aqueous dis- persion to be applied to the backing.

In some embodiments, the aqueous dispersion further comprises a wetting agent. Suitable wetting agents include anionic surfactants (e.g., sulfates, sulfonates, phosphates, carboxylates, and sulfates of polyethoxylated derivatives of straight or branched chain aliphatic alcohols and carboxylic acids), cationic surfactants (e.g., quaternary ammonium salts), amphoteric surfactants (e.g., sultaines, betaines, and sulfobetaines), and nonionic surfactants. In some embodi- ments, the wetting agent is a nonionic surfactant. Suitable wetting agents include those available from Evonik, Austin, Tex., under the trade designations "SURFYNOL PSA 336" and "SURFYNOL AS 5060".

The wetting agent may be present in the aqueous disper- sion in any suitable amount to promote wetting of the aqueous dispersion on the backing. In some embodiments, the wetting agent is present in a range from 0.01% to 2% by weight, 0.05% to 0.5% by weight, or about 0.1% by weight, based on the total weight of the aqueous dispersion.

The reactive layer may be applied to the backing using a variety of techniques (e.g., rod coating, knife coating, bar coating, curtain coating, gravure coating, roll coating, slot or die coating, dip coating, spray coating). After applying the reactive layer to the backing, in some embodiments, the reactive layer is present in a range from two grams per square meter (gsm) to 15 gsm (dry). Useful amounts of reactive layer can be, for example, 2 gsm to 10 gsm, 2 gsm to 8 gsm, or 4 gsm to 8 gsm for paper and polymer film backings. For polymer/cloth laminates, useful amounts of reactive layer can be, for example, 8 gsm to 15 gsm.

The tape of the present disclosure includes a PSA on the reactive layer. PSAs are generally known to possess the following desirable properties: (1) aggressive and perma- nent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired bal- ance of tack, peel adhesion, and shear holding power.

While PSAs are desirably cleanly removable from an adherend, clean removability can be challenging, particu- larly after aging at elevated temperatures. A lack of clean removability can be indicative of poor cohesive strength in the PSA and/or poor bonding of the PSA to the backing in a PSA tape.

In the tape of the present disclosure, the PSA includes a hydrocarbon elastomer. Hydrocarbon elastomers that may be crosslinked typically include carbon-carbon double bonds. Examples of useful unsaturated elastomers include natural rubber, synthetic polyisoprene, polybutadiene, sty- rene/butadiene rubber (SBR), butyl rubber, ethylene-propyl- ene-diene monomer rubber, and block copolymers in which one of the blocks is a block of one of the above elastomers, such as styrene-isoprene-styrene, styrene-butadiene-styrene, styrene-isoprene-butadiene-styrene, styrene-ethylene-buty- lene-styrene triblock or styrene-isoprene, styrene-butadiene, styrene-ethylene-butylene starblock polymers. Various backbone geometries and connectivities may be present in these polymers. For polybutadiene and polyisoprene, a high amount of cis geometry may be desirable. Combinations of two or more of these elastomers may be present in the composition, for example, natural rubber and SBR. In some embodiments, the elastomer comprises at least one of natu- ral rubber or a block copolymer of styrene with isoprene or butadiene. In some embodiments, the elastomer comprises natural rubber and a star block copolymer of styrene and isoprene. In some embodiments, the elastomer comprises a styrene-isoproprene-styrene or styrene-isoproprene-butadi- ene-styrene block copolymer. These elastomers are available from commercial sources.

In some embodiments, the PSA composition includes at least about 20 percent by weight and up to about 80 percent by weight of the elastomer(s), based on the total weight of the PSA composition. In some embodiments, the elastomer is present in a range from 80 to 30, 75 to 40, 70 to 30, 70 to 40, 70 to 45, or 65 to 45 percent by weight, based on the total weight of the PSA composition.

In the tape of the present disclosure, the PSA includes a tackifying resin. Tackifying resins generally refer to materials that are compatible with the elastomer and have a number average molecular weight of up to 10,000 grams per mole. Useful tackifying resins can have a softening point of at least 70° C. as determined using a ring and ball apparatus and a glass transition temperature of at least −30° C. as measured by differential scanning calorimetry. The tackifying resins are typically amorphous. In some embodiments, the number average molecular weight of the tackifying resin is up to about 5000 grams/mole, 4000 grams/mole, 2500 grams/mole, 2000 grams/mole, or 1500 grams/mole. In some embodiments, the number average molecular weight is in the range of 200 to 5000 gram/mole, in the range of 200 to 4000 grams/mole, in the range of 200 to 2000 grams/mole, or in the range of 200 to 1500 gram/mole. Number average molecular weights are determined using gel permeation chromatography according to methods known to a person skilled in the art. In some embodiments, the tackifying resin is a hydrocarbon tackifying resin.

In some embodiments, the tackifying resin comprises at least one of a polyterpene (e.g., those based on α-pinene, β-pinene, or limonene), a rosin acid, a rosin ester, an aliphatic hydrocarbon resin (e.g., those based on cis- or trans-piperylene, isoprene, 2-methyl-but-2-ene, cyclopentadiene, dicyclopentadiene, or combinations thereof), an aromatic resin (e.g. those based on styrene, α-methyl styrene, methyl indene, indene, coumarone, or combinations thereof), or a mixed aliphatic-aromatic hydrocarbon resin. The aromatic hydrocarbon resins may be C9-type petroleum resins obtained by copolymerizing a C9 fraction produced by thermal decomposition of petroleum naphtha, and aliphatic hydrocarbon resins may be C5-type petroleum resins obtained by copolymerizing a C5 fraction produced by thermal decomposition of petroleum naphtha. Mixed aliphatic/aromatic resins may be C5/C9-type petroleum resins obtained by polymerizing a combination of a C5 fraction and C9 fraction produced by thermal decomposition of petroleum naphtha. Any of these tackifying resins may be hydrogenated (e.g., partially or completely). The term rosin, as employed herein, includes natural rosin, refined or unrefined (refined rosin will usually contain, by weight, about 90% of rosin acids and about 10% of inert material), such as natural wood rosin, natural gum rosin, and tall oil rosin; modified rosin, refined or unrefined, such as disproportionated rosin, hydrogenated rosin, and polymerized rosin; and the pure or substantially pure acids, of which rosin is comprised, alone or in admixture.

Some suitable tackifying resins are commercially available under the trade designations "ARKON" from Arakawa Chemical Industries Co., Ltd. (Osaka, Japan); "ESCOREZ" from ExxonMobil Chemical Company (Spring, Texas); "REGALREZ" and "PICCOTAC" from Eastman Chemical (Kingsport, TN); "WINGTACK" from Cray Valley (Exton, PA); and others listed in the Examples, below.

In some embodiments, the PSA composition includes at least about 15 percent by weight and up to about 70 percent by weight of the tackifying resin, based on the total weight of the composition. In some embodiments, the tackifying resin is present in a range from 15 to 60, 15 to 50, 20 to 60, 20 to 50, 20 to 45, or 15 to 35 percent by weight, based on the total weight of the PSA composition.

In some embodiments of the tape of the present disclosure, the PSA includes a metal rosinate. A metal rosinate is sometimes referred to in the art as a metal resinate. The terms are considered interchangeable. The metal rosinate can be salt of any of the rosins described above. The metal rosinate useful in the PSA composition generally comprises a salt of an acid having the molecular formula $C_{19}H_{29}COOH$, in some embodiments, at least one of abietic acid or pimaric acid. In some embodiments, the metal rosinate comprises a salt of at least one of abietic acid, neoabietic acid, palustric acid, levopimaric acid, pimaric acid, or an isopimaric acid. In some embodiments, the metal rosinate comprises dehydro- or hydrogenated rosin acids, for example, dehydroabietic acid, dihydroabietic acid, and tetrahydroabietic acid.

Examples of metal cations in the metal rosinate useful in the PSA composition include aluminum (Al), calcium (Ca), magnesium (Mg), zinc (Zn), barium (Ba), lithium (Li), sodium (Na), and potassium (K). In some embodiments, the metal rosinate comprises at least one of zinc rosinate, calcium rosinate, or magnesium rosinate. In some embodiments, the metal rosinate comprises zinc rosinate. Metal rosinates are commercially available from a variety of sources or can be prepared by treating a commercially available rosin with a metal salt (e.g., zinc oxide or calcium hydroxide) using techniques known in the art.

In some embodiments, the metal rosinate is present in the PSA composition in a range from two percent to 50 percent by weight, based on the total weight of the PSA composition. In some embodiments, the metal rosinate is present in the composition in an amount of at least 2, 3, or 5 percent by weight and up to 40, 30, 20, 19, 18, 17, or 16 percent by weight, based on the total weight of the PSA composition. The useful amounts of metal rosinate include amounts typically sufficient to tackify the composition. In some embodiments, the metal rosinate can be used as the only tackifying resin in the PSA composition. In some embodiments, a combination of metal rosinate and one or more other tackifying resins (e.g., polyterpene, an aliphatic hydrocarbon resin, an aromatic resin, or a mixed aliphatic-aromatic hydrocarbon resin) is used to tackify the PSA. In some embodiments, a combination of metal rosinate and a C5 hydrocarbon resin is used to tackify the PSA. In some embodiments, the combined amount of metal rosinate and another tackifying resin is present in a range from 15 to 60, 15 to 50, 20 to 60, 20 to 50, 20 to 45, or 15 to 35 percent by weight, based on the total weight of the PSA composition.

In some embodiments, to achieve higher crosslink density, the PSA composition for the tape of the present disclosure includes a crosslinker that has at least two carbon-carbon double bonds that react upon exposure to the sulfur in the reactive layer or upon radiation crosslinking. These compounds react with radicals to ultimately crosslink with the hydrocarbon elastomer. In order to be crosslinking, the two carbon-carbon double bonds are not in aromatic rings. Examples of suitable crosslinkers (also known as synergists, pro-rads, or coupling agents) include reactive aromatic, aliphatic or heteroatomic monomers or oligomers that contain at least two carbon-carbon double bonds usually in the form of acrylate, allylic or maleimide moieties. The crosslinker comprising at least two carbon-carbon double bonds can be particularly useful, for example, when the PSA on the tape is thick and when the PSA includes block copolymers such as styrene-isoprene-styrene, styrene-butadiene-styrene, styrene-isoprene-butadiene-styrene, styrene-ethylene-butylene-styrene triblock or styrene-isoprene, styrene-butadiene, and/or styrene-ethylene-butylene starblock polymers.

Useful acrylate crosslinkers include multifunctional acrylic and methacrylic acid esters of alcohols, usually polyols. Examples of these crosslinkers include 1,6-hexanediol dimethacrylate, 1,6-hexanediol diacrylate, trimethylolpropane triacrylate, trimethylolpropane trimethacrylate, neopentyl glycol diacrylate, neopentyl glycol dimethacrylate, pentaerythritol tetracrylate, and pentaerythritol tetramethacrylate.

Useful allylic crosslinkers include multifunctional alkenes that are usually prepared from the reaction of allylic halides with various nucleophiles to produce allylic ethers, esters, or amines. Examples of these crosslinkers include triallyl cyanurate, triallyl isocyanurate, and allyl methacrylate.

Useful maleimide crosslinkers include those produced from the reaction of maleic acid anhydride and multifunctional amines; for example, 1,6-diaminoahexane, bis(4-aminophenyl)methane, tris(2-aminoethyl)amine and 1,3-phenylenediamine. For further discussion of the preparation and use of maleimides as crosslinking agents, see: "Crosslinking of Polymers with Dimaleimides", Kovacic, P. and Hein, R. W.; J; Am. Chem. Soc. 1959, 81, 1187; "Crosslinking of Unsaturated Polymers with Dimaleimides", Kovacic, P. and Hein, R. W.; J. Am. Chem. Soc. 1959, 81, 1190; and "Vulcanization with Maleimides", Tawney, P. O., Weisch, W. J., Van der Berg, S, and Relyea, D. I.; J. Appl. Polym. Sci. 1964, 8, 2281.

A number of adjuvants may also be useful in the PSA composition. Examples of such adjuvants include antioxidants, such as hindered phenols, amines, sulfur and phosphorous hydroperoxide decomposers, and butylated hydroxytoluene (BHT)); inorganic fillers such as talc, zinc oxide, titanium dioxide, aluminum oxide, and silica; and plasticizing aids such as those materials described as plasticizers in the Dictionary of Rubber, K. F. Heinisch, pp. 359, John Wiley & Sons, New York (1974), oils, elastomer oligomers, and waxes. Useful commercially available antioxidants include those available from BASF, Florham Park, NJ, under the trade designations "IRGANOX" and "IRGAFOS" such as "IRGANOX 1010" and "IRGANOX 1520" and those available from Songwon Ind. Co, Ulsan, Korea, under the trade designations "SONGNOX". Useful plasticizing oils include paraffinic oils, aromatic oils, and naphthene oils such as those available, for example, from Process Oils Inc., Houston, TX. The plasticizing oil may be selected based on viscosity, for example. Compositions according to the present disclosure can also include at least one of pigments, dyes, ultraviolet absorbers, hindered amine light stabilizers, and heat stabilizers, if desired. When present, typically the antioxidant is present in the PSA composition in an amount of 0.1 to 5 parts by weight per 100 parts by weight elastomer; the inorganic filler can present in the composition in an amount of up to 50 parts by weight per 100 parts by weight of elastomer; and the plasticizing aid is present in the composition in an amount from one to 30, 20, 15, or 10 percent by weight of the total adhesive weight. In some embodiments, for example, in embodiments in which the PSA includes block copolymers such as styrene-isoprene-styrene, styrene-butadiene-styrene, styrene-isoprene-butadiene-styrene, styrene-ethylene-butylene-styrene triblock or styrene-isoprene, styrene-butadiene, and/or styrene-ethylene-butylene starblock polymers, the plasticizing oil is present in an amount from 10 percent to 30 percent by weight, based on the total weight of the PSA.

A PSA composition as described above in any of its embodiments, including the hydrocarbon elastomer, tackifying resin(s) optionally including a metal rosinate, and optionally including a crosslinker, can be processed on a two-roll mill or in a Banbury type internal mixer. The PSA composition can be provided in water or solvent, for example, by dissolving the elastomer and other hydrocarbon components in an organic solvent (e.g., any of those described above) and then coating the solution onto a backing, for example, as described above in any of its embodiments, or other substrate, and drying the coated product to remove the solvent.

In some embodiments, the curable composition is essentially free of volatile organic solvent. Volatile organic solvents are typically those have a boiling point of up to 150° C. at atmospheric pressure. Examples of these include many of those described above. "Essentially free of volatile organic solvent" can mean that volatile organic solvent may be present (e.g., from a previous synthetic step or in a commercially available component) in an amount of up to 2.5 (in some embodiments, up to 2, 1, 0.5, 0.1, 0.05, or 0.01) percent by weight, based on the total weight of the composition.

In some embodiments, the PSA composition is prepared using a hot melt process. Useful hot melt processes include that described, for example, in U.S. Pat. No. 5,539,033 (Bredahl et al.) for non-thermoplastic elastomers. The process employs a continuous compounding device and hot melt processing techniques and eliminates the need to use plasticizers as a major component of the adhesive composition. The continuous compounding device has a sequence of alternating conveying and processing zones. The elastomer is continuously conveyed from one zone to another by the device. The processing zones are capable of masticating the hydrocarbon elastomer and of mixing additives into the hydrocarbon elastomer. The PSA composition can be applied to a moving web of a backing, for example, directly from the compounding device so as to provide a continuous method for the manufacture of PSA tape. The backing may be as described above in any of its embodiments.

In some embodiments of the tape and process of the present disclosure, the hydrocarbon elastomer is at least partially crosslinked by exposure to radiation, such as electron beam or ultraviolet radiation. Crosslinking may be carried out in-line with a continuous operation described above or may occur as a separate process. In some embodiments, crosslinking is carried out after the PSA composition is disposed on a backing. The degree of crosslinking achieved is a matter of choice and is dependent upon various factors such as the end product desired, the hydrocarbon elastomer used, and the thickness of the adhesive layer. Techniques for achieving crosslinking via exposure to radiation are known to those of skill in the art.

Radiation-crosslinking can enhance, for example, the cohesive strength of the composition. In some embodiments, the hydrocarbon elastomer is crosslinked to the point where at least 20% by weight of the elastomer is insoluble by the following gel content evaluation. Gel content is determined by soaking a sample of the composition in toluene for 24 hours to extract the portion of the adhesive that is not crosslinked, determining the amount of gelled elastomer in the extracted sample, and dividing the amount of gelled elastomer by the amount of rubber in the adhesive formulation.

In embodiments in which the polymeric film backing is radiation degradable (e.g., vinyl films, cellulose films, polypropylene films, and polyfluoroethylene films, it may be useful to irradiate the composition on the polymeric film backing using a narrow voltage range as described in U.S. Pat. No. 5,266,400 (Yarusso et al.). Control of the voltage provides adequate uniformity of adhesive cure through the thickness thereof while limiting backing damage or degradation to acceptable levels.

In some embodiments, the PSA is present on the reactive layer in a range from 20 gsm to 150 gsm. Useful amounts of PSA can be, for example, 20 gsm to 60 gsm, 20 gsm to 40 gsm, or 40 gsm to 60 gsm for paper and polymer film backings. For polymer/cloth laminates, useful amounts of PSA can be, for example, 80 gsm to 150 gsm.

As shown in each of Examples 1 to 6, below, the tape of the present disclosure is cleanly removable from a painted surface after exposure to a temperature of at least 300° F. (150° C.) for at least 30 minutes. As shown in Table 8, each of Comparative Examples A to C, which includes a non-reactive primer layer suitable for paper backings instead of the reactive layer, had adhesive transfer to the painted surface at this temperature. Similarly, as shown in Table 12, a control example that included a PSA on a corona-treated primed poly(ethylene terephthalate) backing had adhesive transfer to the painted surface at this temperature. The clean removal of the tape of the present disclosure from substrates at high temperature suggests that the cohesive (internal) strength of the overall tape construction is greater than the adhesive strength between the tape and the substrate. Such cohesive strength is indicative of good bonding between materials in the tape construction and good crosslinking of the PSA, which counteracts thermal degradation of the elastomer. Clean removal of tape from substrates refers to having no adhesive transfer or residue when evaluated according to the Adhesive Transfer Test described in the Examples, below.

As shown in the Holding Power test and Rolling Ball Test described in the Examples, below, that the tape of the present disclosure provides good holding power without compromising the initial tack of the adhesive.

As shown in the Examples 2 to 6, below, an even higher temperature resistance is observed in the tape when zinc rosinate is present in the PSA composition. As shown in Tables 8, 12, and 19 and in Example 5, the tape of the present disclosure having zinc rosinate in the PSA composition is cleanly removable from a painted surface after exposure to a temperature of at least 325° F. (163° C.) for at least 30 minutes and in some cases at least 360° F. (182° C.) for at least 30 minutes. While the present disclosure is not intended to be bound by theory, it is believed that a metal rosinate can serve as a vulcanization activator as described above.

Phenolic crosslinking of unsaturated elastomers has been reported to improve, for example, high temperature properties. See, for example, U.S. Pat. No. 5,439,963 (Korpman). Common phenolic curatives include alkyl phenolic resins, aryl phenolic resins, and halogenated (e.g., brominated) phenolic resins. We have found that in order to achieve clean removal at 300° F. to 325° F. using an octyl phenolic in a primer layer, the primer layer needs to have high concentration phenolic resin (60% to 75% dry) such as that shown in Table 16. However, this high concentration of phenolic resin in the interface between backing and the adhesive resulted in poor initial adhesive anchorage. In a comparison between Comparative Example D and Example 6 in Table 18, the removal force of the adhesive from the backing in Example 6 was almost double that of Comparative Example D, which included a phenolic primer layer. This high initial adhesive anchorage with the sulfur reactive layer helped the tape the tape of the present disclosure to have clean removal at temperatures below 280° F. (138° C.) as well as higher temperatures such as 300° F. to 360° F. (150° C. to 182° C.). However, Comparative Example D having a phenolic primer layer showed adhesive transfer at 220° F. (104° C.) and 250° F. (121° C.), limiting its utility over a wide range of temperatures. Other drawback of the alkyl phenolic resin is that it is difficult to make into water-based primer, and solvent is typically needed to dissolve the phenolic resin as shown in European Patent Application Publication 0668335, published Feb. 17, 1994. In contrast, it is possible to provide the reactive layer in the tape of the present disclosure from a completely water-based dispersion, if desired.

Accordingly, in some embodiments, at least one of the reactive layer or the pressure sensitive adhesive is substantially free of phenolic curative, including any of the phenolic curatives described above. The phrase "substantially free of phenolic curative" means that any phenolic curative may be present at a level of up to 2, 1, 0.5, or 0.1 percent by weight, based on the total weight of the phenolic curative and elastomer. Being "substantially free of" phenolic curative agent includes being "free of" phenolic curatives.

The tape of the present disclosure may be useful for a variety of different applications that require the tape to be exposed to a variety of different temperatures or a wide range of temperature. The tape of the present disclosure can be useful, for example, as a masking tape or for any other use that requires high temperature holding power and clean removal. The present disclosure provides of method of using the tape of the present disclosure. The method includes applying the tape to a surface and exposing the surface to a temperature of at least 150° C. The surface may be a component of an automobile, airplane, or marine vessel, for example. In some embodiments, the surface comprises at least one of glass, steel, or a painted surface.

Some Embodiments of the Disclosure

In a first embodiment, the present disclosure provides tape comprising:

a backing having a first face and a second face;

a reactive layer on the first face of the backing, the reactive layer comprising:

a rubber at least partially crosslinked with polysulfide bonds; and sulfur; and a pressure sensitive adhesive on the reactive layer, the pressure sensitive adhesive comprising:

a hydrocarbon elastomer that is at least partially cross-linked; and a tackifying resin.

In a second embodiment, the present disclosure provides the tape of the first embodiment, wherein the hydrocarbon elastomer comprises at least one of natural rubber, synthetic polyisoprene rubber, styrene-butadiene rubber, butyl rubber, ethylene-propylene-diene monomer rubber, polybutadiene, a styrene-containing triblock copolymer, or a styrene-containing star block copolymer, wherein the styrene-containing triblock copolymer and styrene-containing star block copolymer independently comprise a block of at least one of polyisoprene, polybutadiene, or ethylene/butylene.

In a third embodiment, the present disclosure provides the tape of the first or second embodiment, wherein the tackifying resin comprises at least one of a polyterpene, a rosin acid, a rosin ester, a C5 aliphatic hydrocarbon resin, a C9 aromatic resin, or a mixed aliphatic-aromatic hydrocarbon resin.

In a fourth embodiment, the present disclosure provides the tape of any one of the first to third embodiments, wherein the pressure sensitive adhesive further comprises a metal rosinate.

In a fifth embodiment, the present disclosure provides the tape of the fourth embodiment, wherein the metal rosinate comprises at least one of zinc rosinate, calcium rosinate, or magnesium rosinate.

In a sixth embodiment, the present disclosure provides the tape of any one of the first to fifth embodiments, wherein the composition further comprises a crosslinker comprising at least two carbon-carbon double bonds crosslinked with the hydrocarbon elastomer.

In a seventh embodiment, the present disclosure provides the tape of the sixth embodiments, wherein the crosslinker comprises at least one of crosslinked hexanediol diacrylate, hexanediol dimethacrylate, neopentyl glycol diacrylate, neopentyl glycol dimethacrylate, trimethylol propane triacrylate, trimethylol propane trimethacrylate, pentaerythritol triacrylate, or pentaerythritol trimethacrylate.

In an eighth embodiment, the present disclosure provides the tape of any one of the first to seventh embodiments, wherein the rubber at least partially crosslinked with polysulfide bonds comprises at least one of natural rubber, synthetic polyisoprene rubber, styrene/butadiene rubber, or acrylonitrile butadiene rubber.

In a ninth embodiment, the present disclosure provides the tape of any one of the first to eighth embodiments, wherein the reactive layer further comprises at least one of a vulcanization accelerator, a vulcanization activator, or a tackifying resin.

In a tenth embodiment, the present disclosure provides the tape of the ninth embodiment, wherein the tackifying resin comprises a rosin ester.

In an eleventh embodiment, the present disclosure provides the tape of any one of the first to tenth embodiments, wherein the reactive layer comprises not more than ten percent by weight of the tackifying resin.

In a twelfth embodiment, the present disclosure provides the tape of any one of the first to eleventh embodiments, wherein the reactive layer is present in a range from two grams per square meter to 15 grams per square meter.

In a thirteenth embodiment, the present disclosure provides the tape of any one of the first to twelfth embodiments, wherein the pressure sensitive adhesive is present in a range from 20 grams per square meter to 150 grams per square meter.

In a fourteenth embodiment, the present disclosure provides the tape of any one of the first to thirteenth embodiments, wherein the hydrocarbon elastomer is at least partially crosslinked with polysulfide bonds.

In a fifteenth embodiment, the present disclosure provides the tape of any one of the first to fourteenth embodiments, wherein the backing comprises paper, polyester, poly(vinyl chloride), polypropylene, or polyethylene laminated cloth.

In a sixteenth embodiment, the present disclosure provides the tape of any one of the first to fifteenth embodiments, wherein the tape is cleanly removable from a surface after exposure to a temperature of at least 150° C. for at least 30 minutes.

In a seventeenth embodiment, the present disclosure provides the tape of the sixteenth embodiment, wherein the surface comprises at least one of glass, steel, or a painted surface.

In an eighteenth embodiment, the present disclosure provides the tape of the seventeenth embodiment, wherein the surface is a component of an automobile, airplane, or marine vessel.

In a nineteenth embodiment, the present disclosure provides the tape of any one of the first to the eighteenth embodiments, wherein at least one of the reactive layer or the pressure sensitive adhesive is substantially free of a phenolic curative.

In a twentieth embodiment, the present disclosure provides the tape of any one of the first to the nineteenth embodiments, further comprising a low-adhesion backsize on the second face of the backing.

In a twenty-first embodiment, the present disclosure provides a process of making the tape of any one of the first to the twentieth embodiments, the process comprising:

applying a dispersion of the rubber and sulfur to the backing;

drying the dispersion to provide the reactive layer; and applying a pressure sensitive adhesive composition comprising the hydrocarbon elastomer and the tackifying resin as a hot melt on the reactive layer to provide the tape.

In a twenty-second embodiment, the present disclosure provides the process of the twenty-first embodiment, further comprising exposing the tape to radiation to partially crosslink at least the hydrocarbon elastomer.

In a twenty-third embodiment, the present disclosure provides the process of the twenty-second embodiment, wherein the radiation is electron beam radiation, ultraviolet light, or a combination thereof.

In a twenty-fourth embodiment, the present disclosure provides the process of any one of the twenty-first to twenty-third embodiments, further comprising heating the tape to partially crosslink at least one of the hydrocarbon elastomer or rubber with the sulfur to form the polysulfide bonds.

In a twenty-fifth embodiment, the present disclosure provides the process of any one of the twenty-first to twenty-fourth embodiments, wherein applying the pressure sensitive adhesive composition as a hot melt is carried out at a temperature of at least 150° C.

In a twenty-sixth embodiment, the present disclosure provides the process of the twenty-fifth embodiment, wherein applying the pressure sensitive adhesive composition at a temperature of at least 150° C. partially crosslinks at least one of the hydrocarbon elastomer or the rubber with the sulfur to form the polysulfide bonds.

In a twenty-seventh embodiment, the present disclosure provides the process of any one of the twenty-first to twenty-sixth embodiments, wherein the dispersion is an aqueous dispersion.

In a twenty-eighth embodiment, the present disclosure provides the process of the twenty-seventh embodiment, wherein the aqueous dispersion comprises the rubber, the sulfur, and at least one tackifying resin, vulcanization accelerator, vulcanization activator, or a combination thereof.

In a twenty-ninth embodiment, the present disclosure provides the process of any one of the twenty-first to twenty-eighth embodiments, wherein the aqueous dispersion is substantially free of volatile organic solvent.

In a thirtieth embodiment, the present disclosure provides the process of any one of the twenty-first to twenty-ninth embodiments, wherein the pressure sensitive adhesive composition is substantially free of volatile organic solvent.

In a thirty-first embodiment, the present disclosure provides a method of using the tape of any one of the first to twentieth embodiments, the method includes applying the tape to a surface and exposing the surface to a temperature of at least 150° C.

In a thirty-second embodiment, the present disclosure provides the use of the tape of any one of the first to twentieth embodiments at a temperature of at least 150° C.

Embodiments of the compositions and methods disclosed herein are further illustrated by the following examples, but the particular materials and amounts thereof recited in these examples, as well as other conditions and details, should not be construed to unduly limit this invention.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. The following abbreviations are used in this section: g=gram, kg=kilogram, m=meter, centimeter=cm, mm=millimeter, in.=inches ° C.=degrees Celsius, ° F.=degrees Fahrenheit, RH=relative humidity, MPa=mega Pascal, rpm=revolutions per minute, phr=parts per hundredths rubber, psi=pounds per square inch, lb=pound, sec=second, oz=ounces, min=minutes, ft=feet, gsm=grams per square meter, W=watts, MRad=Mega Rad, and KV=kilovolt.

Table 1 (below) lists materials used in the examples and their sources.

Test Methods

Adhesion To Glass Test

Sample rolls were acclimated in controlled temperature environment (73.4+/−3.6° F. [23+/−2 CC], 50+/−5% R.H) before starting the test. The peel tester (IMASS SP200, IMASS Inc., Accord, Mass.) parameters were set to run at average time of 5 seconds and testing speed of 90 in./min (229 cm/min). The 6-in. by 12-in. (15.24-cm by 30.48-cm) glass panel (Soda Lime Glass obtained from Northwestern Glass Fab, Fridley, Minn.) was secured to the peel tester platen. The glass panel was painted black using an acrylic lacquer spray paint on the "wire" side of the glass panel, not on the testing side. The "wire" side will glow when put under a black light. The peel tester was then calibrated.

The black painted glass panel was cleaned with a quarter size quantity of diacetone alcohol and then wiped off with a "KIMWIPES" cleaning tissue. An additional "KIMWIPES" cleaning tissue was used to wipe the glass plate again, removing any remaining diacetone alcohol and making sure the glass surface looked clean. Finally, three N-heptane washes were used, using a "KIMWIPES" cleaning tissue to wipe off the N-heptane from the glass plate in between each wash.

Test samples were prepared by removing the outer 3 laps from a 1-in. (2.54-cm) wide tape roll before cutting the roll to 1-in. by 13-in. (2.54-cm by 33-cm) long strips. The ends of the tape sample were then held in each hand. The left end

TABLE 1

| Materials List | |
| --- | --- |
| Designation | Description |
| K100 | C5 aliphatic tackifying resin (100 degrees Celsius softening point), obtained under the trade designation "QUINTONE K100" from Zeon Corporation, Tokyo, Japan |
| CV60 | Natural rubber, TSR grade, obtained under the trade designation "CV60" from RCMA Americas, Norfolk, VA. |
| D1340 | Multi-arm styrene-isoprene star block copolymer, obtained under the trade designation "KRATON D1340" from Kraton Corporation, Houston, TX |
| SBR 1011 | Styrene- butadiene rubber, obtained under the trade designation "SBR 1011" from Lion Elastomers, Port Neches, TX |
| AQUATEC 6085 | Rosin resin dispersion (60% solids), obtained under the trade designation "AQUATEC 6085" from Kraton Corporation |
| ALCANTEX | Natural rubber latex (61.6% solids), obtained under the trade designation "ALCANTEX H.A." from Alcan Rubber and Chemical, New York, NY |
| NS209 | Styrene- butadiene rubber latex (51% solids), obtained under the trade designation "BUTOFAN NS209" from BASF Corporation, Florham Park, NJ |
| OCTOCURE 590 | Sulfur dispersion (60% solids), obtained under the trade designation "OCTOCURE 590" from Tiarco Chemical, Dalton, GA |
| SURFYNOL PSA 336 | Wetting agent, obtained under the trade designation "SURFYNOL PSA 336" from Evonik, Austin, TX |
| IRG1010 | Antioxidant, obtained under the trade designation "IRGANOX 1010" from BASF Corporation, Florham Park, NJ |
| IRG1520L | Antioxidant, obtained under the trade designation "IRGANOX 1520L" from BASF Corporation |
| PINEREZ 9089 | Ca—Zn resinate of disproportionated gum rosin, obtained under the trade designation "PINEREZ 9089" from Lawter, Chicago, IL |
| SARET 519 | Trimethylolpropane triacrylate (TMPTA), obtained under the trade designation "SARET 519" from Sartomer, Exton, PA |
| HYPENE L750 | Plasticizer oil, obtained under the trade designation "HYPENE L750" from Ergon Inc., Jackson, MS | of the sample was then touched to the left end of the black painted glass plate, and the right end of the tape sample was then touched to the right end of the glass plate. A 4.5-lb (2-kg) rubber roller was then placed at the left end of the glass plate, sitting the rubber roller on top the tape sample. The peel tester platen was then engaged to move at 90 in./min (229 cm/min), with the left hand guiding the rubber roller as it rolled down the tape sample onto the black painted glass panel. Once the peel tester platen stopped, the 4.5 lb (2-kg) rubber roller was removed from the tape sample and the platen returned to starting position. The left end of the tape sample was then attached to the wired leader with a stirrup and removed nearly all the slack by adjusting the platen. When platen stopped, the average force was measured and recorded, and the amount of transferred adhesive was reported.

Adhesion To Steel Test

Sample rolls were acclimated in controlled temperature environment (73.4+/−3.6° F. [23+/−2° C.], 50+/−5% R.H) before starting the test. The peel tester (INSTRON Model 3343Q8711, Norwood, Mass.) parameters were set to run at run a crosshead speed of 12 in/min (30.5 cm/min), a jaw separation of 5 in (12.7 cm), full-scale load of 100 oz. (4.8 kg), a peel distance of 5 in (12.7 cm), and a peel force average distance set to measure between 2 in (5.1 cm) and 4 in (10.2 cm) of sample length. The peel tester was then calibrated.

The stainless-steel panel (2-in (5.1 cm) by 5-in (12.7 cm) stainless steel Type 304 as prescribed in ASTM A666 with a bright annealed finish, 18 gauge (1.2 mm) thickness, and a polish finish on one side with a surface roughness height of 1.5+/−0.5 micro inches (0.038+/0.013 micrometers) obtained from ChemInstruments, Fairfield, Ohio) was cleaned with a quarter size quantity of diacetone alcohol and then wiped off with "KIMWIPES" cleaning tissue. An additional "KIMWIPES" cleaning tissue was used to wipe the stainless-steel panel again, removing any remaining diacetone alcohol making sure the surface looked clean. Finally, 3 N-heptane washes were used, using a "KIM-WIPES" cleaning tissue to wipe off the N-heptane from the stainless-steel plate in between each wash.

Test samples were prepared by removing the outer 3 laps from a 1-in (2.54-cm) wide tape roll before cutting the roll to 1-in. by 13-in. (2.54-cm by 33-cm) long strips. The ends of the tape sample were then held in each hand. The sample was positioned above the stainless-steel panel so the long edge of the sample was parallel to the long side of the panel and so the specimen was centered in the middle of the vertical direction of the panel. The tape sample was then laid onto the stainless-steel panel, making sure there was 1 in. (2.54 cm) of the tape sample extending from the top of the panel and that the remaining 7 in. (17.8 cm) of the tape sample were extended from the bottom of the panel.

The tape sample was then rolled onto the stainless-steel panel using a 4.5-lb (2-kg) rubber roller. The rubber roller was moved up and down the panel twice in each direction at approximately 24 in./min (61 cm/min) ensuring only to allow the weight of the roller to apply the force to the tape sample. A razor blade was used to cut, along the edge of the top of the panel, the 1 in. (2.54 cm) of the tape sample that was extended from the top of the panel. The extended 7-in. (17.8-cm) tape sample was held from the bottom of the panel, and the tape sample was peeled back by hand 1-in (2.54 cm) from the bottom edge of the panel. The bottom end of the stainless-steel panel was clamped into the lower jaw of the peel tester. The top end of the 7-in (17.8-cm) tape sample extending from the bottom of the panel was clamped into the upper jaw of the peel tester. The crosshead peel test was carried out on the peel tester, and the average peel force value and the amount of transfer were recorded.

Rolling Ball Test

Sample rolls were acclimated in controlled temperature environment (73.4+/−3.6° F. P3+/−2° C.1, 50+/−5% R.H) before starting the test. A TT100 Modified ChemInstruments Inclined Ramp and level platform were used to perform the test. The platform was leveled with an accompanying bubble level, which was set in the center of platform. The three base screws were adjusted to align the bubble within the circle target. Both ends of the platform were secured with tape to prevent movement between tests.

A strip of 2-in. (5.1-cm) wide 3M #411 double coated tape (3M Company, St. Paul, Minn) was applied down the length of the platform. The 7/16-in. (1.1-cm) stainless-steel ball bearings were cleaned with one wash of diacetone alcohol, using a "KIMWIPES" cleaning tissue to remove the diacetone alcohol from ball bearing surface. This was followed by one dry wipe with an additional "KIMWIPES" cleaning tissue to remove any remaining diacetone alcohol from the ball bearing surface, followed by three washes with N-heptane, using a "KIMWIPES" cleaning tissue to wipe off the remaining N-heptane from the ball bearing surface between each wash. After each ball bearing was cleaned, they were placed on an aluminum tray lined with "KIMWIPES" cleaning tissue. Nitrile rubber disposable gloves were used to place the ball bearing on the aluminum tray. After the cleaning procedure was completed, the ball bearings were allowed to sit and acclimate in a temperature-controlled environment at (73.4+/−3.6° F. [23+/−2 CC], 50+/−5% R.H) for 20 minutes.

Test samples were prepared by removing the outer 3 laps from a 1-in (2.54-cm) wide tape roll before cutting the roll to 1 in. (2.54 cm) by 12 in. (30.5 cm) long strips. With adhesive side facing up, the tape sample was laid on the double-coated tape on the platform base. The tape sample was secured and centered in the middle of the 2-in. (5.1-cm) wide double coated tape. Ensured did not touch tape adhesive surface but made sure it laid flat to the platform.

The TT100 Modified ChemInstruments Inclined Ramp was placed on the left side of the level platform with the left edge of the ramp flush with the left edge of the platform with its rear touching the two guide pins located on the left side of the platform. The ramp was aligned so that it was centered on top of the surface of the 1-in (2.54-cm) wide tape sample. A McMaster Can #2056A23 300-mm graduated ruler was placed in the lengthwise direction of the platform along the bottom right edge of the ramp. A ball bearing, handled using the disposable gloves, was placed on top of the ramp. The ball-bearing holding mechanism on the ramp was activated, allowing the ball bearing to roll freely down the ramp and on to the adhesive surface of the tape sample. The distance the ball bearing traveled was measured using the ruler. The distance to the center point of the ball bearing was measured in millimeters to determine the rolling ball tack value.

Adhesive Anchorage Test

Sample rolls were acclimated in controlled temperature environment (73.4+/−3.6° F. [23+/−2° C.], 50+/−5% R.H) before starting the test. The IMASS SP200 peel tester parameters were set to run at average time of 5 seconds and testing speed of 90 in/min (229 cm/min). A 6 in. by 12 in. (15.24-cm by 30.48-cm) black painted glass panel (described above) was secured to the peel tester platen. The peel tester was then calibrated.

A strip of 2-in. (5.1-cm) wide 3M #411 double coated tape (3M Company) without liner was applied lengthwise on the center of a black painted glass panel. Test samples were prepared by removing the outer 3 laps from a 1-in (2.54-cm) wide tape roll before cutting the roll to 1 in. (2.54 cm) by 12 in. (30.5 cm) long strips. With adhesive side facing up, the tape sample was laid on the double-coated tape on the platform base. A strip of 0.5-in. (1.27-cm) wide 3M #56 tape (3M Company) was applied so that it was centered on top of the test tape sample, with the adhesive side facing down.

The liner that was removed from double coated adhesive tape was placed on top of the removal tape sample with the release side facing down. A 4.5-lb (2-kg) rubber roller was placed at the left end of the black painted glass panel on top of the liner.

The peel tester was engaged to make the platen move at 90 in./min (229 cm/min), guiding the roller with left hand as it rolled down the liner, from the left side of the glass panel to the right side of the black painted glass panel. Once the peel tester platen stopped, the rubber roller was removed from the top of the liner and the liner was removed from the top of the 3M #56 tape. The peel tester platen was the returned to the starting position. 100% adhesive transfer of the tape sample's adhesive to the 3M #56 tape was initiated by removing the 3M #56 tape from the tape sample at the left end of the black painted glass panel. Once 100% adhesive transfer was initiated, the left end of the 3M #56 tape was attached to the wired leader stirrup which was connected to the 10-lb (4.5-kg) load cell on the peel tester. The slack was removed by adjusting the platen. The platen drive was started, and after the platen stopped, the peel force average value displayed was recorded Since the 3M #56 tape was 0.5-in (1.27-cm) wide, the peel force average value was recorded as oz/0.5 in, which can be converted to g/1.27 cm using a factor of 28.3495.

Holding Power Test

72° F. (22 V) Test

Sample rolls were acclimated in controlled temperature environment (73.4+/−3.6° F. [23+/−2° C.], 50+/−5% R.H) before starting the test.

A 3-in. by 5-in. (7.6-cm by 12.7-cm) stainless-steel panel (obtained from ChemInstruments and having the features described above) was cleaned as described above for the Adhesion to Steel Test.

Test samples were prepared by removing the outer 3 laps from a 0.75-in. (1.91-cm) wide tape roll before cutting the roll to 0.75-in. (1.91-cm) by 8-in. (20.3-cm) long strips. The tape sample was applied to the stainless-steel panel in a vertical direction so that it was centered and parallel to the long edges of the panel, with the leading two in. (5.08 cm) hanging over the bottom edge of the panel. The tape sample was rolled down to the stainless-steel panel twice in each direction (up and down the panel) at 24 in./min (61 cm/min) using a 4.5-lb (2-kg) rubber roller. A metal hook was attached to the leading edge of the tape sample, and the sample was pulled back 0.5 in. (1.27 cm) from the bottom edge of the stainless-steel panel. The other end of the sample at the top edge of the stainless-steel panel was trimmed so that 4 in. (10.16 cm) of the tape sample remained bonded to the panel.

A 90-degree peel test stand with timers was used to hold the stainless-steel test panels to run the holding power test. The stainless-steel panel was placed horizontally in the 90-degree peel test stand so the metal hook hung down. A 200-gram weight was attached to the hook, and the timer was started. The time (in minutes) required for the tape sample to peel away from the stainless-steel panel and fall off and the failure type (cohesive or adhesive) were recorded.

220° F. (104° C.) Test

The 220° F. (104° C.). test was carried out using the same procedure as the 72° F. (22° C.) test with the following modifications. The 90-degree peel test stand to hold the stainless-steel test panels was placed inside an air circulating oven. The timers were located outside of the oven. The air circulating oven was set to the 220° F. (104° C.). temperature before hanging the stainless-steel panels on the 90-degree peel test stand. A 25-gram weight was used and attached to the metal hook instead of a 200-gram weight.

Adhesive Transfer Test

The level of adhesive transfer to an enamel painted panel was measured after tape samples were subjected to a bake cycle and the tape samples were partially removed at elevated temperature and then completely removed at room temperature. The tape samples were tested at 3 different oven temperatures with deviation of +/−5° F.: 300° F., 325° F., and 360° F. (149° C., 163° C., and 182° C., respectively).

The tape samples were prepared by using 1-in. (2.54-cm) wide tape roll, removing the outer 3 laps of that roll, and acclimating the roll to room temperature (70° F., 21° C.) before starting the test. A tape sample was made by cutting the roll into 8-in. (20.3-cm) long strips.

Preparing for the test started with placing 4 in. by 8 in. (10.16 cm by 20.3 cm) painted panels enameled with PPG AG129W133 white enamel, with coating less than 60 days old, with enamel side up, on a smooth working surface. The 8-in. (20.3-cm) long tape sample was applied, adhesive side down, parallel to the 4-in. (20.3-cm) side edge of the painted panel at least 0.25 in. (0.635 cm) to the left of the edge. A tab was left beyond the top edge of the panel for handling while a space was left at the bottom end of the panel for identifying the tape sample with an affixed label. All tape samples were applied maintaining a minimum 0.25-in. (0.635-cm) spacing between tape samples or from the edge of the panel.

Each tape sample was rolled down with one back and forth pass of a hand operated rubber covered roller [per standard ASTM/PSTC 4.5 lb (2.04 kg)] at a roll down rate of approximately 2 in./sec (5.08 cm/sec). Next a ruler and felt tip pen were used to draw a line parallel to the long edge of the panel and 2 in. (5.08 cm) down from the top of the panel. The ruler and a razor blade were then used to score the tape samples at the bottom portion of the panel above the label written on each tape sample.

Panels were placed in a circulating air type electric oven capable of maintaining from 150 to 360° F. (65.6 to 182° C.)+/−5° F. (Despatch LFD series Oven, Model: LFD2-11-3, Despatch Industries, Minneapolis, Minn.). The panels were allowed to bake for 30+/−2 min. at desired temperature (300° F., 325° F., and 360° F. (149° C., 163° C., and 182° C., respectively). At the 30 min. time mark, the panels were removed and set on a table using a gloved hand. An IR gun was used to monitor temperature of each panel until the reading indicated reaching 200° F. (93° C.). Once that was achieved, the panels were positioned vertically and each tape sample was removed, one at a time, to the marked line, using an approximate 90-degree removal angle at a rate of 2 in/sec (5.08 cm/sec). The panels were then allowed to continue cooling until they reached room temperature (approximately 15 min.). Remaining parts of each tape sample were then removed from the panel down to the tape label using a removal angle of 90 degrees at a rate of 2 in/sec (5.08 cm/sec). Finally, panels were visually inspected for both hot and cold removal areas for adhesive transfer, and results were reported to the nearest 10%, except for none=0 and 0-5%=trace.

Examples and Comparative Examples

Examples 1 to 3: Paper Backing

Preparation of Reactive Layer for Paper Backing

All materials below in Table 2 were blended together for 15 minutes to make the reactive layer formulation at 42% solids used in the paper backed tape examples. The 50-gsm crepe paper backing was obtained from Ahlstrom-Munksjo, Kaukauna, Wis., and was saturated with a water-based acrylate tetrapolymer release coating described in U.S. Pat. No. 3,011,988 (Luedke et al.) The reactive layer was then applied to the paper backing using a Mayer rod number 10 and was dried at 100° C. at a line speed of 25 ft/min (7.62 m/min.). The coating weight for the reactive layer was 8.0 gsm (dry).

TABLE 2

Reactive Layer Formulation for Paper Backing

| Reactive Layer Formulation | Wet, % |
| --- | --- |
| NR latex (ALCANTEX) | 12.9 |
| SBR latex (NS209) | 12.9 |
| Rosin Ester Dispersion (AQUATAC 6085) | 3.9 |
| Sulfur Dispersion (OCTOCURE 950) | 38.7 |
| SURFYNOL PSA 336 | 0.1 |
| Water | 31.5 |
| Total | 100.0 |

Preparation of Adhesive Formulation for Paper Backing

The materials below in Tables 3 to 5 were combined in separate batches to make the adhesive formulations for the paper backed tape samples. The adhesive formulations were prepared using a twin-screw extruder at 100 rpm and the adhesive melt temperature was 350° F. to 400° F. (177° C. to 204° C.). The adhesive was then coated on to the reactive layer side of the paper backing using a contact die. The coating weight was 40 to 50 gsm. The coated webs were then e-beamed at 4.0 Mrad at 130 KV. The E-beam unit used was a Comet AG, model EBLab-180/210, CH-3175 Flamatt, Switzerland.

TABLE 3

Adhesive Formulation Example 1 (Ex. 1) Paper Backing

| Ex. 1 Adhesive Formulation | PHR | % by parts |
| --- | --- | --- |
| Natural rubber CV60 | 58 | 37.42% |
| SBR 1011 | 42 | 27.10% |
| K100 | 53 | 34.19% |
| IRG1010 | 2 | 1.29% |
| Total | 155 | 100.00% |

TABLE 4

Adhesive Formulation Example 2 (Ex. 2) Paper Backing

| Ex. 2 Adhesive Formulation | PHR | % by parts |
| --- | --- | --- |
| Natural rubber CV60 | 58 | 37.42% |
| SBR 1011 | 42 | 27.10% |
| K100 | 38 | 24.52% |
| PINEREZ 9089 | 15 | 9.68% |
| IRG1010 | 2 | 1.29% |
| Total | 155 | 100.00% |

TABLE 5

Adhesive Formulation Ex. 3 for Paper Backing

| Ex. 3 Adhesive Formulation | PHR | % by parts |
| --- | --- | --- |
| D1340 | 100 | 51.28% |
| K100 | 42 | 21.54% |
| PINEREZ 9089 | 30 | 15.38% |
| IRG1010 | 2 | 1.03% |
| SARET 519HP (LIQUID) | 1 | 0.51% |
| HYPRENE L750 Oil | 20 | 10.26% |
| Total | 195 | 100.00% |

Comparative Examples A to C: Paper Backing

Comparative Examples A to C were prepared using the same procedure and materials as for Examples 1 to 3, respectively, except that the non-reactive primer layer composition shown in Table 6, below, was used instead of the reactive layer.

TABLE 6

Non-Reactive Primer Formulation for Paper Backed Tape Samples

| Non-Reactive Primer Formulation | Wet, % |
| --- | --- |
| NR latex ALCANTEX | 11.2 |
| SBR latex NS209 | 30.4 |
| Rosin Ester Dispersion AQUATAC 6085 | 19.4 |
| Pigment | 5.7 |
| Water | 33.3 |
| Total | 100.0 |

Adhesion test results for Examples 1 to 3 and Comparative Examples A to C are shown in Tables 7 and 8, below. To convert from oz/in. to g/cm, each value can be multiplied by 11.16. To convert from oz/0.5 in. to g/1.27 cm, each value can be multiplied by 28.3495.

TABLE 7

Test Results for Examples 1 to 3 (Ex. 1 to 3)
and Comparative Examples A to C (C.E. A to C)

| Paper Backed Tape Examples | Adhesion To Glass oz/in | Adhesion To Steel oz/in | Adhesive Anchorage oz/0.5 in | Rolling Ball, 5.6-g ball mm | 220 F. 90° holding Power - 25 g min. | Room Temp. 90° holding Power -200 g min. |
|---|---|---|---|---|---|---|
| C.E. A | 51.3 | 33.3 | 91.0 | 65.0 | 328 | 96 |
| Ex. 1 | 50.5 | 35.4 | 103.0 | 72.0 | 2725 | 200 |
| C.E. B | 50.0 | 32.3 | 95.4 | 95.0 | 452 | 73 |
| Ex. 2 | 47.8 | 34.2 | 103.0 | 83.0 | 1855 | 220 |
| C.E. C | 47.0 | 37.0 | 93.5 | 88.0 | 65 | 76 |
| Ex. 3 | 49.0 | 40.0 | 96.0 | 100.0 | 2284 | 750 |

TABLE 8

Adhesive Transfer Test Results for Ex. 1 to 3 and C.E. A to C

| Paper Backed Tape Samples | 300 F. @30 min Removal Hot | 300 F. @30 min Removal Cold | 325 F. @ 30 min Removal Hot | 325 F. @ 30 min Removal Cold | 360 F. @ 15 min Removal Hot | 360 F. @ 15 min Removal Cold |
|---|---|---|---|---|---|---|
| C.E. A | 50% transfer | 40% transfer | heavy transfer | heavy transfer | heavy transfer | heavy transfer |
| Ex. 1 | clean-~3.0% | clean | 40% | 20% | heavy transfer | heavy transfer |
| C.E. B | 50% transfer | 40% transfer | heavy transfer | heavy transfer | heavy transfer | heavy transfer |
| Ex. 2 | clean | clean | clean | clean | ~20% transfer | 10-15% transfer |
| C.E. C | 10-15% transfer | 5% transfer | 20% transfer | 15% transfer | heavy transfer | heavy transfer |
| Ex. 3 | clean | clean | clean | clean | 5% transfer | clean |

Example 4—PET Film Backing

Preparation of Primer Formulation for PET Film Backing

All materials below in Table 9 were blended together for 15 minutes to make the reactive layer formulation at 42% solids used in polyethylene terephthalate (PET) film backed tape examples.

TABLE 9

Reactive Layer Formulation for Example 4

| Reactive Layer Formulation | Wet, % |
|---|---|
| NR latex (ALCANTEX) | 16.8 |
| SBR latex (NS209) | 16.8 |
| AQUATAC 6085 | 5.0 |
| Sulfur dispersion (OCTOCURE 950) | 33.5 |
| SURFYNOL PSA 336 | 0.1 |
| Water | 27.8 |
| Total | 100.0 |

Preparation of PET Film for PET Film Backing 1.5-mil (0.038-mm) thick PET was obtained from Toray Plastics (America), Inc, North Kingstown, R.I. The PET film was first corona treated at 50.0 W/min per m². The corona treatment unit was manufactured by Enercon, Model LM5809-14PVH-25LB1B, Menomonee Fall, Wis. The reactive layer formulation was then applied to the corona treated backing using a Mayer rod number 10 and was dried at 100° C. at a line speed of 25 ft/min (7.62 m/min.). The coating weight for the reactive layer was 4.0 gsm (dry). Corona treated PET film without reactive layer was used as a control backing.

Preparation of Adhesive Formulation for Example 4

The materials below in Table 10 were combined to make the adhesive formulation for the PET film backed tape samples. The adhesive formulation was prepared using a twin-screw extruder at 100 rpm and the adhesive melt temperature was 350° F. (177° C.). The adhesive was then coated on to the corona-treated side of the PET film backing using a contact die. Both PET film backings with reactive layer and without reactive layer were coated at 35 gsm, and then the coated webs were e-beamed at 4.0 Mrad at 130 KV using the unit described above for Examples 1 to 3.

TABLE 10

Adhesive Formulation for PET Film Backed Tape Samples

| Adhesive Formulation | PHR | % by parts |
|---|---|---|
| D1340 | 100 | 54.35% |
| K100 | 42 | 22.83% |
| PINEREZ 9089 | 20 | 10.87% |
| IRG1520L | 2 | 1.09% |
| HYPRENE L750 Oil | 20 | 10.87% |
| Total | 184 | 100.00% |

Adhesive tests for Example 4 and the control with no reactive layer are shown in Tables 11 and 12, below.

TABLE 11

Test Results for Example 4 and Control

| PET Backed Tape Examples | Adhesion To Glass oz/in. (g/cm) | Adhesion To Steel oz/in. (g/cm) | Rolling Ball, 5.6-g ball mm | Adhesive Anchorage oz/0.5 in. (g/1.27 cm) |
|---|---|---|---|---|
| Example 4 | 47.3 (528) | 31.9 (356) | 45 | 85.9 (2440) |
| Control | 52.3 (584) | 36.9 (412) | 75 | 78.6 (2230) |

TABLE 12

Adhesive Transfer Test Results for
PET Film Backed Tape Samples

| PET Backed | 300 F. @30 min Removal | | 325 F. @ 30 min Removal | | 360 F. @ 15 min Removal | |
|---|---|---|---|---|---|---|
| Tape Samples | Hot | Cold | Hot | Cold | Hot | Cold |
| Example 4 | Clean | clean | Clean | clean | Clean | clean |
| Control | 50% transfer | 5% transfer | 100% transfer | 15% transfer | 100% transfer | 20% transfer |

Example 5—PE Laminated Cloth Backing

Preparation of Primer Formulation for PE Laminated Cloth Backed Tape Samples All materials below in Table 13 were blended together for 15 minutes to make the reactive layer formulation at 42% solids used in PE laminated cloth backed tape example.

TABLE 13

Reactive Layer Formulation for Example 5

| Reactive Layer Formulation | Wet, % |
|---|---|
| NR latex (ALCANTEX) | 13.5 |
| SBR latex (NS209) | 13.5 |
| AQUATAC 6085 | 4.1 |
| Sulfur dispersion (OCTOCURE 950) | 40.5 |
| SURFYNOL PSA 336 | 0.1 |
| Water | 28.4 |
| Total | 100.0 |

Preparation of PE Laminated Cloth for PE Laminated Cloth Backed Tape Samples PE laminated Cloth backing with a thickness of 11.0 mil (0.28 mm) was first corona treated at 50.0 W/min per m² using the equipment described above for Example 4. The PE thickness used in the lamination was 3.5 mil (0.089 mm), and the cloth used was 100% cotton cloth with a thread count of 60 (machine direction threads per inch)×44 (cross direction threads per inch). PE laminated cloth was obtained from Charter Nex Films, Bloomer, Wis. Reactive primer was applied to the corona treated backing using a Mayer rod number 14 and dried at 100° C. at a line speed of 25 ft/min (7.62 m/min.). The coating weight for the reactive layer was 10.0 to 12.0 gsm (dry).

Preparation of Adhesive Formulation for PE Laminated Cloth Backed Tape Samples The materials below in Table 14 were combined to make the adhesive formulation for the PE laminated cloth backed tape samples. The adhesive formulation was prepared using a twin-screw extruder at 100 rpm and the adhesive melt temperature was 350° F. (177° C.). The adhesive was then coated on to the reactive layer using a contact die. The coating weight was 110 gsm. The coated webs were e-beamed at 4.0 Mrad at 200 KV using the unit described in Examples 1 to 3 above.

TABLE 14

Adhesive Formulation for PE Laminated
Cloth Backed Tape Samples

| Adhesive Formulation | PHR | % by parts |
|---|---|---|
| D1340 | 100 | 51.02% |
| K100 | 52 | 26.53% |
| PINEREZ 9089 | 20 | 10.20% |
| SARET 519 | 2 | 1.02% |
| IRG1520L | 2 | 1.02%] |
| HYPRENE L750 | 20 | 10.20% |
| Total | 196 | 100.00% |

The Adhesive Transfer Test was carried out for Example 5 at 300° F. (149° C.) and 325° F. (163° C.) on a painted metal panel. Example 5 showed clean hot and cold removal at both of these temperatures. Further adhesive test results for Example 5 are shown in Table 15, below.

TABLE 15

Test Results for PE Laminated Cloth Backed Tape Sample

| Adhesion To Glass oz/in. (g/cm) | Adhesion To Steel oz/in. (g/cm) | Rolling Ball, 5.6-g ball mm | Adhesive Anchorage oz/0.5 in. (g/1.27 cm) |
|---|---|---|---|
| 62.4 (696) | 51.5 (575) | 25 | 110.9 (3144) |

Comparative Example D and Example 6: Paper Backing

Preparation of Phenolic Reactive Primer Formulation for Comparative Example D HRJ 10518 alkyl phenolic resin was obtained from SI Group, Schenectady, NY. All materials below in Table 16 were blended together for 60 minutes to make the phenolic reactive primer formulation at 40% solids used in paper backed tape samples. The crepe paper backing was the same as that used for Examples 1 to 3 and Comparative Examples A to C. The phenolic reactive primer formulation was applied to the paper backing using a Mayer rod number 10 and was dried at 100° C. at a line speed of 25 ft/min (7.62 m/min.). The coating weight was 6.0 gsm dry.

TABLE 16

Phenolic Reactive Primer Formulation for
Paper Backed Tape Samples (Solvent Based)

| Phenolic Reactive Primer Formulation | Wet, % |
|---|---|
| Natural rubber, CV60 | 10 |
| HRJ 10518 alkyl phenolic resin | 29.8 |
| IRG1010 | 0.4 |
| Heptane | 59.8 |
| Total | 100 |

Preparation of Adhesive Formulation for
Comparative Example D

The materials below in Table 17 were combined to make the adhesive formulation for Comparative Example D. "PICCOTAC 1098" was obtained from Eastman Chemical Company (Kingsport, TN). The adhesive formulation was prepared using a twin-screw extruder at 100 rpm and the adhesive melt temperature was 350° F. (177° C.). The adhesive was then coated on to the primed side of the paper backing using a contact die. The coating weight was 50 gsm. The coated webs were e-beamed at 4.0 Mrad at 130 KV using the equipment described above for Example 1 to 3.

TABLE 17

Adhesive Formulation for Comparative Example D

| Adhesive Formulation | PHR | % by parts |
|---|---|---|
| D1340 | 100 | 51.55% |
| PICCOTAC 1098 | 52 | 26.80% |
| PINEREZ 9089 | 20 | 10.31% |
| IRG1520L | 2 | 1.03% |
| HYPENE L750 | 20 | 10.31% |
| Total | 194 | 100.00% |

Example 6

Example 6 was prepared using the same procedure and materials as for Comparative Example D except the reactive layer formulation shown in Table 13 was used instead of the Reactive Phenolic Primer Formulation. All materials in Table 13 above were blended together for 15 minutes to make the sulfur reactive layer formulation at 40% solids used in Example 6.

Adhesion test results for Example 6 and Comparative Example D are shown in Tables 18 and 19, below.

TABLE 18

Test Results for Comparative Example
D (C.E. D) and Example 6 (Ex. 6)

| Reactive Primer Paper Backed Tape Samples | Adhesion To Glass oz/in. (g/cm) | Adhesion To Steel oz/in. (g/cm) | Rolling Ball, 5.6-g ball mm | Adhesive Anchorage oz/0.5 in. (g/1.27 cm) |
|---|---|---|---|---|
| C.E. D | 46.0 (513) | 32.0 (357) | 70 | 45.0 (1280) |
| Ex. 6 | 47.9 (535) | 31.5 (352) | 55 | 82.0 (2320) |

TABLE 19

Adhesive Transfer Test Results for C.E D and Ex. 6

| Reactive Primer Paper Backed | 220 F. @30 min Removal | | 250 F. F. @ 30 min Removal | | 325 F. @ 30 min Removal | |
|---|---|---|---|---|---|---|
| Tape Samples | Hot | Cold | Hot | Cold | Hot | Cold |
| C.E. D | 30% transfer | 10% transfer | 20% transfer | 3% transfer | Clean | clean |
| Ex. 6 | clean | clean | clean | clean | clean | clean |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A tape comprising:
a backing having a first face and a second face;
a reactive layer on the first face of the backing, the reactive layer comprising:
a rubber at least partially crosslinked with polysulfide bonds; and
sulfur; and
a pressure sensitive adhesive on the reactive layer, the pressure sensitive adhesive comprising:
a hydrocarbon elastomer that is at least partially cross-linked; and
a tackifying resin.

2. The tape of claim 1, wherein the hydrocarbon elastomer comprises at least one of natural rubber, synthetic polyisoprene rubber, styrene-butadiene rubber, butyl rubber, ethylene-propylene-diene monomer rubber, polybutadiene, a styrene-containing triblock copolymer, or a styrene-containing star block copolymer, wherein the styrene-containing triblock copolymer and styrene-containing star block copolymer independently comprise a block of at least one of polyisoprene, polybutadiene, or ethylene/butylene.

3. The tape of claim 1, wherein the tackifying resin comprises at least one of a polyterpene, a rosin acid, a rosin ester, a C5 aliphatic hydrocarbon resin, a C9 aromatic resin, or a mixed aliphatic-aromatic hydrocarbon resin.

4. The tape of claim 1, wherein the pressure sensitive adhesive further comprises a metal rosinate.

5. The tape of claim 1, wherein the pressure sensitive adhesive further comprises a crosslinker comprising at least two carbon-carbon double bonds crosslinked with the hydrocarbon elastomer.

6. The tape of claim 1, wherein the rubber at least partially crosslinked with polysulfide bonds comprises at least one of natural rubber, synthetic polyisoprene rubber, styrene/butadiene rubber, or acrylonitrile butadiene rubber.

7. The tape of claim 1, wherein the reactive layer further comprises at least one of a vulcanization accelerator, a vulcanization activator, or a tackifying resin.

8. The tape of claim 1, wherein the reactive layer comprises not more than ten percent by weight of a tackifying resin.

9. The tape of claim 1, wherein the hydrocarbon elastomer is at least partially crosslinked with polysulfide bonds.

10. The tape of claim 1, wherein the backing comprises at least one of paper, polyester, poly(vinyl chloride), polypropylene, or polyethylene laminated cloth.

11. The tape of claim 1, wherein at least one of the reactive layer or the pressure sensitive adhesive is substantially free of a phenolic curative.

12. A process of making the tape of claim 1, the process comprising:

> applying a dispersion of the rubber and sulfur to the backing;
>
> drying the dispersion to provide the reactive layer; and
>
> applying a pressure sensitive adhesive composition comprising the hydrocarbon elastomer and the tackifying resin as a hot melt on the reactive layer to provide the tape.

13. The process of claim 12, further comprising exposing the tape to radiation to partially crosslink at least the hydrocarbon elastomer.

14. The process of claim 12, wherein applying the pressure sensitive adhesive composition as a hot melt is carried out at a temperature of at least 150° C., and wherein applying the pressure sensitive adhesive composition at a temperature of at least 150° C. partially crosslinks at least one of the hydrocarbon elastomer or the rubber with the sulfur to form the polysulfide bonds.

15. The process of claim 12, wherein the dispersion is an aqueous dispersion.

16. The process of claim 12, wherein the pressure sensitive adhesive composition further comprises a crosslinker comprising at least one of hexanediol diacrylate, hexanediol dimethacrylate, neopentyl glycol diacrylate, neopentyl glycol dimethacrylate, trimethylol propane triacrylate, trimethylol propane trimethacrylate, pentaerythritol triacrylate, or pentaerythritol trimethacrylate.

17. A method of using the tape of claim 1, the method comprising applying the tape to a surface and exposing the surface to a temperature of at least 150° C.

18. The method of claim 17, wherein the surface comprises at least one of glass, steel, or a painted surface.

19. The method of claim 17, wherein the surface is a component of an automobile, an airplane, or a marine vessel.

20. The tape of claim 1, wherein the tape is cleanly removable from a surface after exposure to a temperature of at least 150° C. for at least 30 minutes.

\* \* \* \* \*